United States Patent [19]
Kahl et al.

[11] Patent Number: 5,428,736
[45] Date of Patent: Jun. 27, 1995

[54] METHOD AND APPARATUS FOR ENTERING AND EDITING DATA OF A DATA ICON IN AN ENLARGED AND MINIMIZED SIZE

[75] Inventors: Daryl J. Kahl, Flower Mound; Robert J. Torres, Colleyville, both of Tex.

[73] Assignee: International Business Machines Corporation, Armonk, N.Y.

[21] Appl. No.: 318,575

[22] Filed: Oct. 5, 1994

Related U.S. Application Data

[63] Continuation of Ser. No. 792,984, Nov. 15, 1991, abandoned.

[51] Int. Cl.⁶ .................................. G06F 3/00
[52] U.S. Cl. ................................... 395/159
[58] Field of Search .................. 375/155–161, 375/700, 137, 200, 275, 131; 345/131, 117–120

[56] References Cited

U.S. PATENT DOCUMENTS

| | | | |
|---|---|---|---|
| 4,714,918 | 12/1987 | Barker et al. | 395/157 X |
| 4,982,345 | 1/1991 | Callahan et al. | 395/139 X |
| 5,001,697 | 3/1991 | Torres | 395/139 |
| 5,023,851 | 6/1991 | Murray et al. | 395/161 X |
| 5,060,135 | 10/1991 | Levine et al. | 395/159 X |
| 5,079,695 | 1/1992 | Dysart et al. | 395/700 |
| 5,140,677 | 8/1992 | Fleming et al. | 395/159 |
| 5,140,678 | 8/1992 | Torres | 395/159 |
| 5,146,556 | 9/1992 | Hullot et al. | 395/159 |
| 5,161,213 | 11/1992 | Knowlton | 395/139 X |
| 5,199,102 | 3/1993 | Sakuragi | 395/139 |
| 5,227,771 | 7/1993 | Kerr et al. | 395/157 X |

OTHER PUBLICATIONS

Microsoft Windows User's Guide V. 3.0, Microsoft Corp., 1990, pp. 5–76, 80–98.
Macintosh System Software User's Guide V. 6.0, Apple Corp., 1988, pp. 14–43, 148–150.
Desk Set Environmental Reference Guide, Sun Microsystems, Inc., Jun. 1990, pp. 5, 19–21, 93–125, 189–211.
Myers, 'Window Interfaces', IEEE Comp. Graphics & Appl., Sep. 1988, pp. 65–84.
Fujii et al, "Features and a Model for Icon Morphological Transformation", Oct. 1991, pp. 240–245.

*Primary Examiner*—Mark R. Powell
*Assistant Examiner*—John E. Breene
*Attorney, Agent, or Firm*—A. Bruce Clay

[57] ABSTRACT

A data icon comprises a hybrid of the advantages available with a conventional icon and a conventional window. The data icon has a minimized size and an enlarged size, both of which allow interactive entry of information. The enlarged data icon presents a format allowing the entry of information relating to an event similar to a conventional window. When minimized, the enlarged data icon is positioned in a selected location and size depending upon the information contained therein. The minimized data icon displays at least a portion of the information entered into the enlarged data icon.

12 Claims, 6 Drawing Sheets

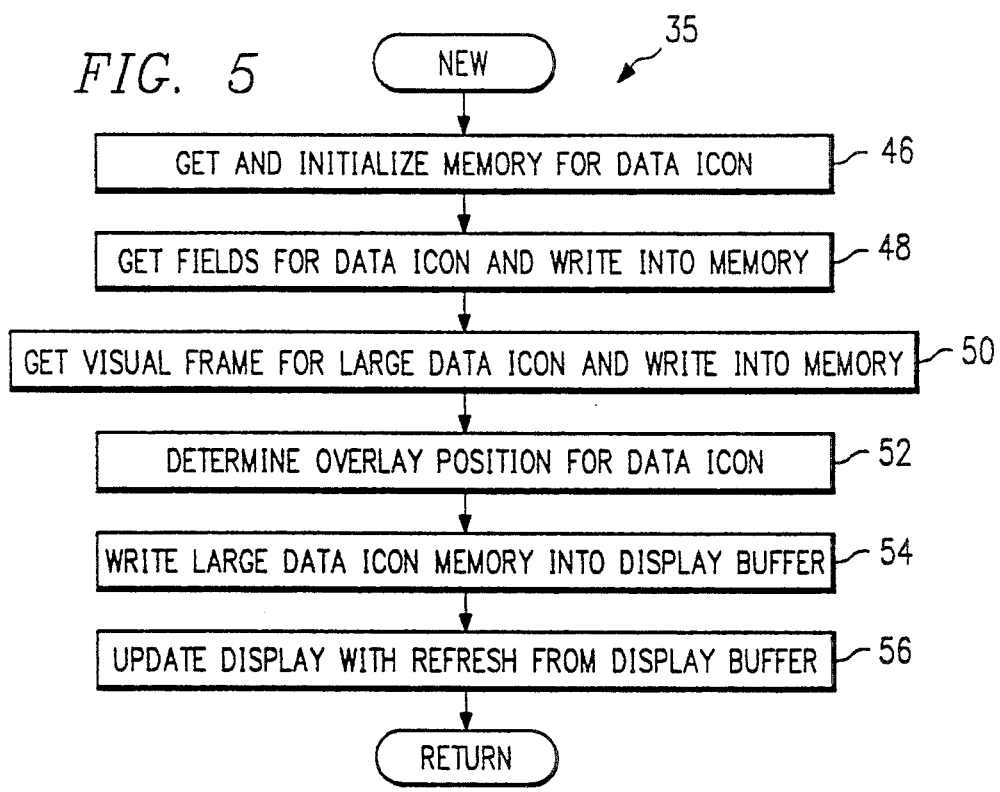
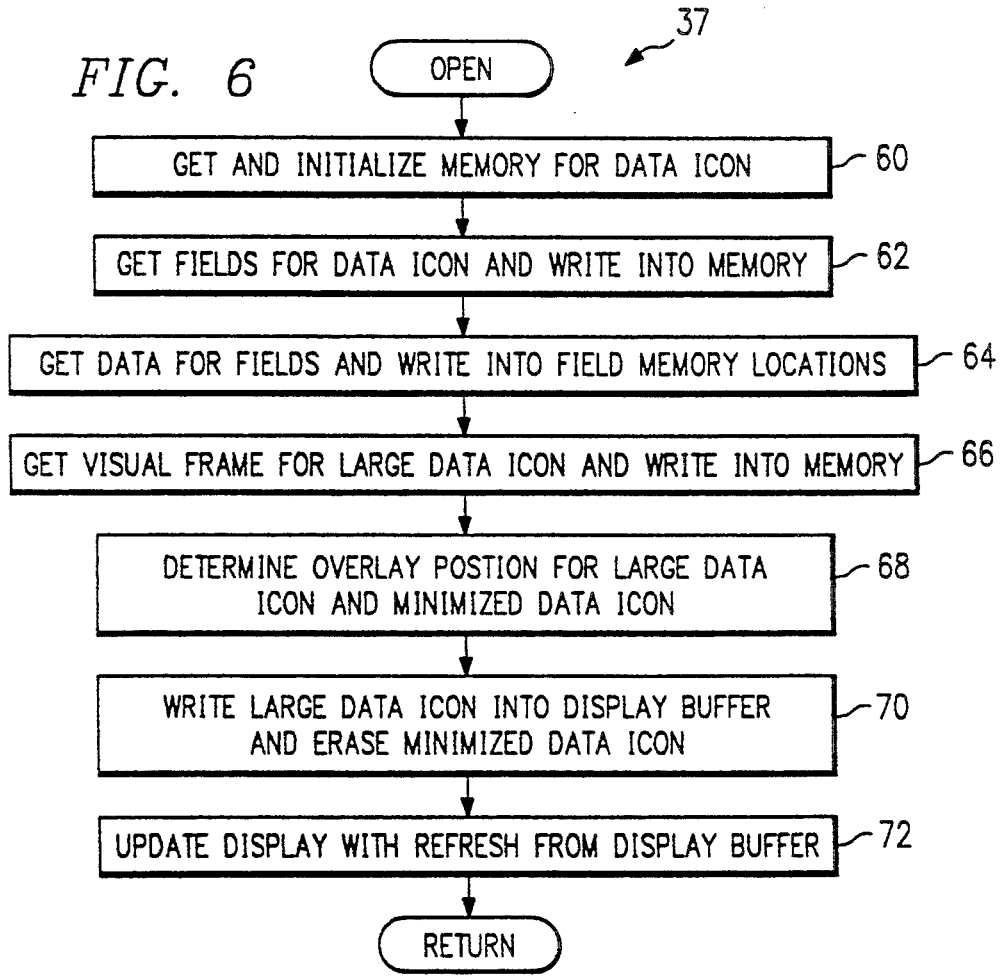

METHOD AND APPARATUS FOR ENTERING AND EDITING DATA OF A DATA ICON IN AN ENLARGED AND MINIMIZED SIZE

The application is a continuation of application Ser. No. 07/792,984, filed Nov. 15, 1991, now abandoned.

TECHNICAL FIELD OF THE INVENTION

This invention relates in general to graphical user interface systems, and in particular to a method and apparatus which allows direct entry of data into, and editing of data in, a hybrid icon/window without the necessity of switching in and out of standard windows and icons.

BACKGROUND OF THE INVENTION

Conventional graphical user interface systems provide icons which may be graphical representations of windows which have been taken from their operating state to some minimized view giving a minimum of identification data only, i.e., enough information so the operator knows what the window would be if selected. Preferably, icons are representations or pictures that suggest what the window is or what the window does. When opened, the icon enlarges or zooms to a conventional window with action bars, title bars, other icons and application data. Thus, even for many simple operations, users are forced to deal with the full complexity of graphical interfaces. Additionally, when the window is closed, it is shrunk down, or tokenized, to an icon and at a fixed location, generally positioned at the bottom of a screen, and the information entered into the window is not visible.

From the above, an icon may represent a window. When the icon is selected and a window is caused to be opened, information may be entered into the window. The operator must first select the icon to open the window and then select an action within the window such as, for example, "Add an Event". Upon selection of the action, another window appears to allow the operator to fill in the new event information. Subsequently, the operator selects the command to store the new information which allows the new information to be integrated into any information previously entered. The operator must then close the second window into which information was added, and, finally, close the first window which allowed the selection of a window for the adding of information. Thereafter, the operator would be returned to the screen from which the original icon was selected and the updated information would again be available for viewing by the operator only when the icon is again selected and a window is opened.

Thus conventional icon/window usage requires numerous operator steps to enter information and to be able to view and re-review the information. Additionally, conventional icon/window technology results in the opening of a full window upon selection for opening of an icon. It currently is not possible to enter information into an icon and, therefore, both time and screen space is wasted. Thus, there is a need for a method and apparatus to allow direct user interaction with information contained in icons that overcomes deficiencies with conventional approaches.

SUMMARY OF THE INVENTION

The invention disclosed herein comprises a method and apparatus for utilizing hybrid icons/windows to directly input information which substantially eliminates or reduces the problems of inputting information using both standard windows and standard icons. The method and apparatus described herein allow direct user interaction with information contained in the hybrid icons/windows.

In accordance with one aspect of the present invention, a method for inputting information utilizing hybrid icons/windows is provided. The method comprises selecting a hybrid icon/window (or data icon) having a first size to create an enlarged version of the hybrid icon/window. Information is then entered directly into the enlarged version of the hybrid. Previously entered information in the enlarged version can also be edited. The enlarged version of the hybrid is then returned to its first size allowing viewing of the information and limited editing thereof. The method further comprises the step of reselecting the first size hybrid to allow additional input of or editing of the information entered therein.

The present invention has the technical advantage of allowing direct user interaction with information contained in icons. The present invention has the further advantage of saving operator and computer time by simplifying the steps necessary to enter and/or edit information. The present invention has the still further advantage of reducing the amount of space which is required for use on a screen during information entry.

BRIEF DESCRIPTION OF THE DRAWINGS

For a more complete understanding of the present invention and the advantages thereof, reference is now made to the Detailed Description taken in conjunction with the attached Drawings, in which:

FIG. 5 is a flow chart of the NEW sub-routine of FIG. 4;

FIG. 6 s a flow chart of the OPEN sub-routine of FIG. 4;

DETAILED DESCRIPTION OF THE INVENTION

Figure 1:
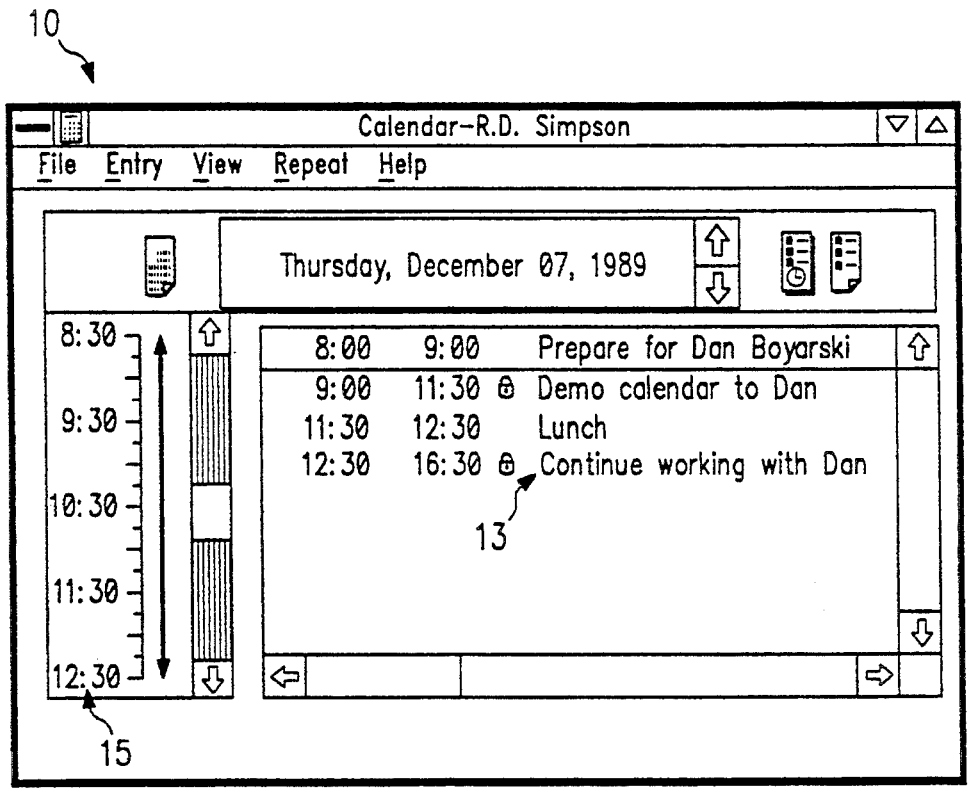
FIG. 1 illustrates a calendar in accordance with the prior art.
Figure 2:
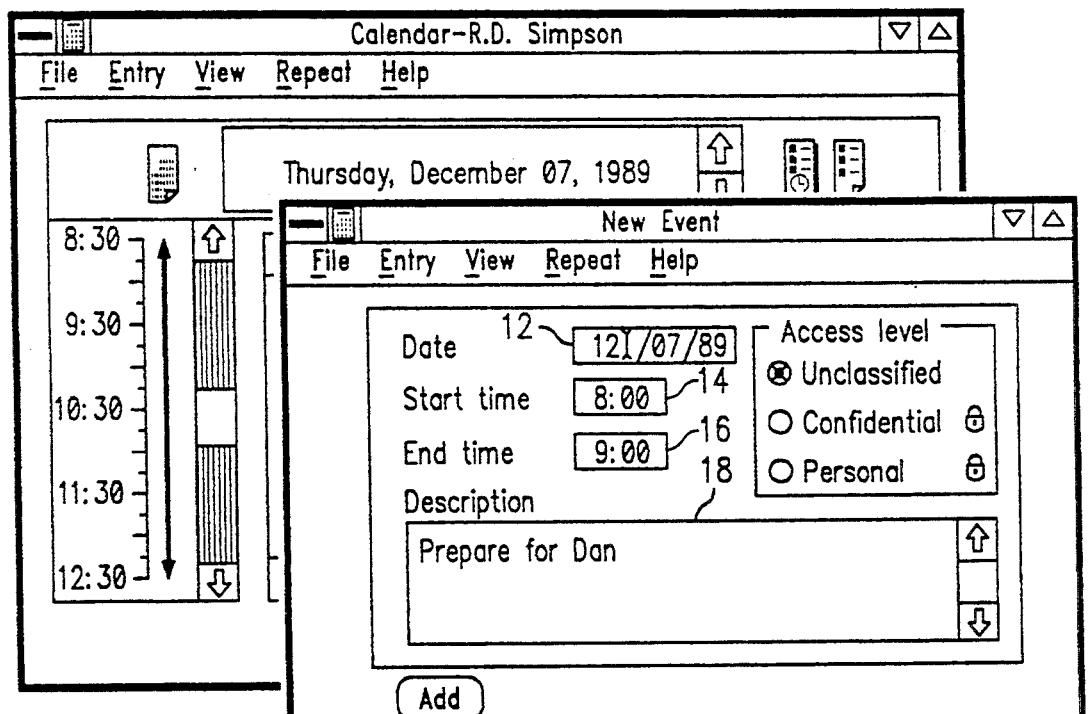
FIG. 2 illustrates a window over the calendar of FIG. 1 for entering information.

Referring first to FIG. 1, an example of a conventional calendar window is generally identified by the reference numeral 10. The window 10 provides information about the daily schedule of an individual listing events in textual form. To enter data into the window 10, a second window generally identified by the reference numeral 11, see FIG. 2, must be opened. The information is then typed into the appropriate fields, such as date 12, start time 14, end time 16, and description 18, by an operator. As used herein, an "operator" is defined as a person who uses a computer program installed on a computer system. The term "user" may be used interchangeably herein to mean the same as an "operator". Once the information is entered into the window 11, the window 11 is shrunk down or tokenized back into the icon (not shown) from which it originated thus allowing viewing of information entered in the window 10 (FIG. 1). As can be seen in FIG. 2, once the window 11 is selected for the entry of new information, the information previously displayed in the window 10 is obscured. Additionally, the information entered into the window 10 via the window 11 can be seen to have little correlation to the arrangement of information in the window 10. For example, a line of information 13 indicating a time frame of 12:30–16:30 does not match with the corresponding time frame on a time bar 15.

Figure 3:
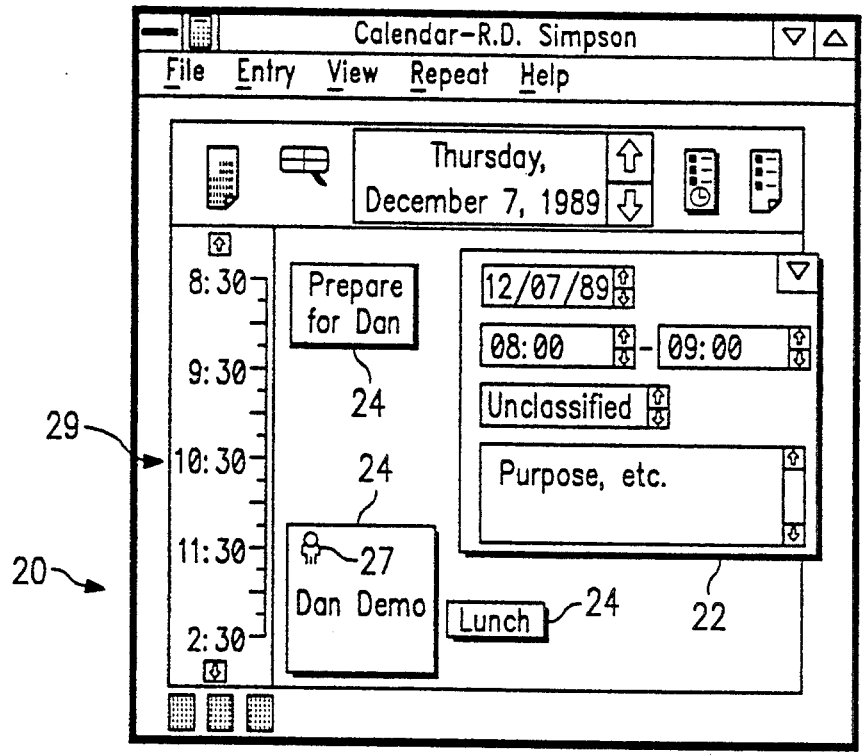
FIG. 3 illustrates a calendar utilizing data icons in accordance with the present invention.

Referring next to FIG. 3, a window incorporating data icons in accordance with the present invention, is generally indicated by the reference numeral 20. A data icon as used herein is a mixture or hybrid of the advantages available from the use of conventional icons and conventional windows. The window 20 includes examples of an enlarged data icon 22 and minimized data icons 24. The enlarged data icon 22 allows display of interactive information such as data entry fields, lists and other controls plus direct manipulation move, borders, copying, and etc. The minimized data icons 24 display a subset of the interactive information from the enlarged data icon 22. The minimized data icons 24 may be sized by the amount of information therein, by the time frame to which they refer, duration, priority and etc.

It is readily apparent from the arrangement of the data icons 24 when there is a scheduling overlap or conflict. By the positioning of icons within the data icons 24, such as, for example, a stick FIG. 27, particular information about the event (number of attendees) can be graphically illustrated.

The following Table 1 displays a comparison of a conventional window, a conventional icon and a data icon.

TABLE 1

| FEATURE | WINDOW | ICON | DATA ICON |
|---|---|---|---|
| Data | display and interact | cannot see data and under normal operating conditions cannot interact w/data | display and interact |
| Position | user controlled | user controlled | user or data controlled |
| Represents | window onto a data object | minimized representation of the data object | data object |
| Change data | show changed data | cannot see data | see changed data and may change location and size |
| Open | opened by activating the icon | to standard size window | to enlarged icon size |
| Size | drag borders to change size | cannot size | drag borders and change data in the enlarged icon |
| Drag (move) | change location has no effect on data | change location has no effect on data | change location changes data |
| Minimize (close) | standard placement and static size | N/A | data driven placement and size |

It can be seen by comparing the various features listed, that the data icon is a hybrid of the features available with conventional windows and conventional icons, as well as improvements thereover. For example, referring to the Change Data feature, it is demonstrated that by changing information in a conventional window, no information can be seen in the related conventional icon. In contrast, by changing information in the data icon, the information is available for viewing directly (either enlarged or minimized data icons). In addition, the entry of new information may change the location and size of the data icon. For example, referring again to FIG. 3, changing the information in one of the minimized data icons 24 (such as the time for start and duration of the event) will change the location of the data icon 24 relative to a time bar 29 as well as changing the size of the data icon 24 to reflect duration. Additionally, moving the location of the data icon 24 will change the information therein. For example, by dragging the data icon 24 to a new position opposite the time bar 29, the time for starting and ending the event will be changed.

Some other advantages of the present invention over the known prior art are: simplified entry and editing of information and reduced use of screen space during information entry. By using the present invention it is no longer necessary to jump from window to window to enter and view information. Additionally, due to the use of minimized data icons, screen space usage is reduced.

Figure 4:
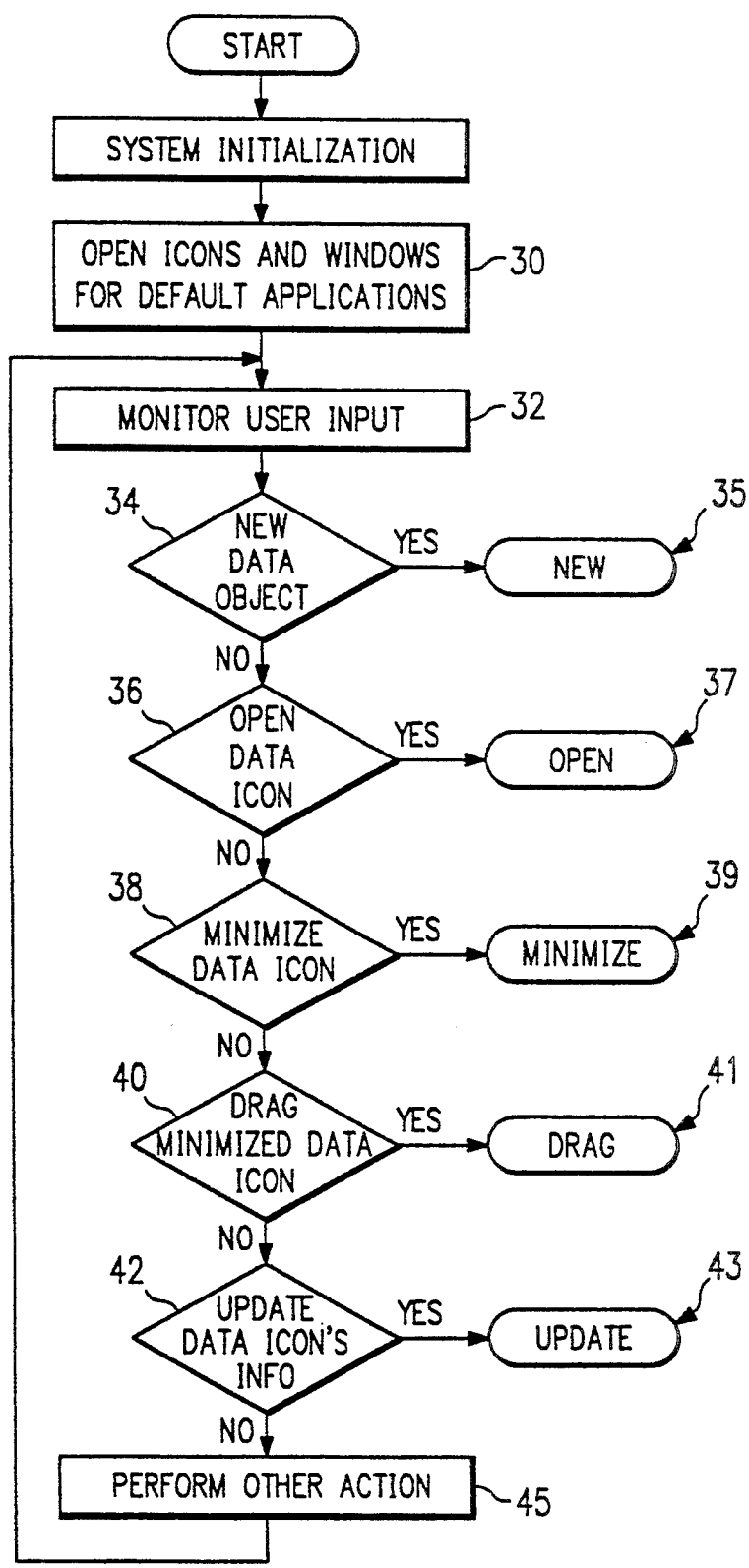
FIG. 4 is a flow chart of the present invention.

Referring next to FIGS. 4 through 9, flowcharts of the present invention are provided. As shown in FIG. 4 at block 30, after system initialization, icons and windows are opened for default applications, i.e. whatever the standard opening screen produces. At block 32, the system is waiting for user instructions. The user instruction are: new data object in decision block 34, open data icon in decision block 36, minimize data icon in decision block 38, drag minimized data icon in decision block 40, update data icon's information in decision block 42 or perform other actions at block 45.

In decision block 34, if a new data object is to be created, a NEW sub-routine 35 is called. The NEW sub-routine 35 allows the entry of new information into a data icon, for example, such as shown in the enlarged data icon 22 in FIG. 2. Referring to FIG. 5, the NEW sub-routine 35 is illustrated in more detail. At block 46, memory for the data icon is obtained and initialized. At block 48, the fields for the data icon are obtained and written into memory. The visual frame for the enlarged data icon is obtained and written into memory at block 50. The overlay position for the data icon is then determined at block 52. Memory for the enlarged data icon is written into a display buffer at block 54 and the display is updated with refresh from the display buffer at block 56. The NEW sub-routine 35 then returns to block 32.

If it is desired to open a minimized data icon to an enlarged data icon, decision block 36 is chosen. The OPEN sub-routine as identified by the reference numeral 37 is called. Referring to FIG. 6, the OPEN sub-routine 37 is illustrated in more detail. As with the NEW sub-routine 35, the OPEN sub-routine 37 first obtains and initializes memory for the data icon at block 60 and obtains and writes the fields for the data icon into memory at block 62. Then, at block 64, data for the fields is obtained and written into the field memory locations. The visual frame for the enlarged data icon is obtained and written into memory. The overlay position for the enlarged data icon and the minimized data icon is determined at block 68. The enlarged data icon is written into the display buffer and the minimized data icon is erased at block 70. The display is then updated with refresh from the display buffer at block 72. The OPEN sub-routine 37 then returns to block 32.

Figure 7:
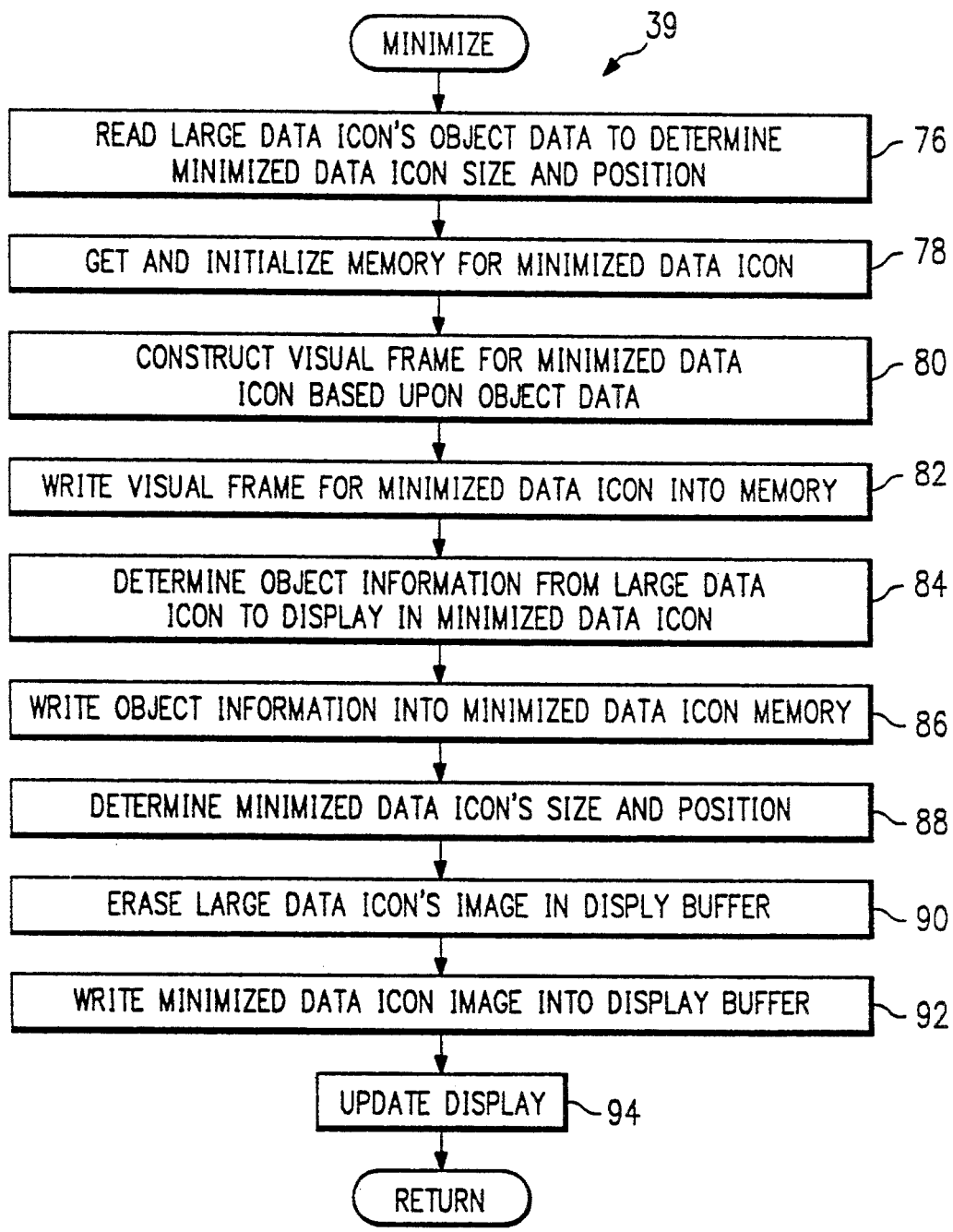
FIG. 7 is a flow chart of the MINIMIZE sub-routine of FIG. 4.

If it is desired to minimize an enlarged data icon decision block 38 is selected. The MINIMIZE sub-routine as identified by the reference numeral 39 is called. Referring to FIG. 7, the MINIMIZE sub-routine 39 is illustrated in more detail. In the MINIMIZE sub-routine 39, the enlarged data icon's object data is read to determine the required size and position for the minimized data icon at block 76. The memory for the minimized data icon is obtained and initialized at block 78 after which the visual frame is constructed for the minimized data icon based upon the object data at block 80. The visual frame for the minimized data icon is written into memory at block 82. At block 84, the object information for display in the minimized data icon from the large data icon is determined. The object information is then written into the minimized data icon memory at block 86 followed by a determination of the minimized data icon's size and position. The enlarged data icon's image is erased from the display buffer at block 90, and the minimized data icon's image is written into the display buffer at block 92. The display is then updated with the minimized data icon at block 94. The sub-routine 39 then returns to block 32.

Figures 8, 9:
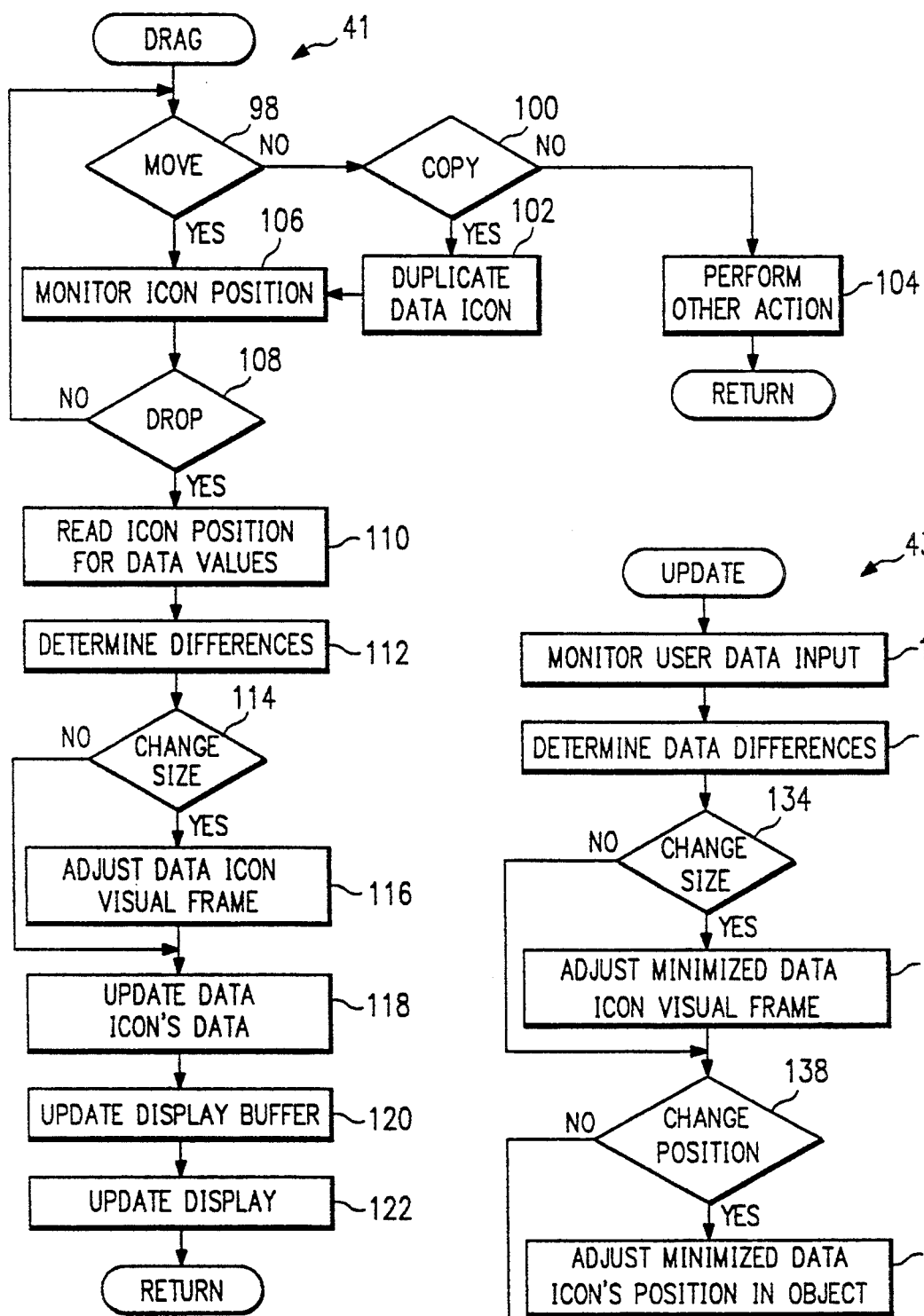
FIG. 8 s a flow chart of the DRAG sub-routine of FIG. 4.
FIG. 9 is a flow chart of the UPDATE sub-routine of FIG. 4.

If it is desired to drag the minimized data icon, decision block 40 is selected. The DRAG sub-routine, as identified by the reference numeral 41, is called. Referring to FIG. 8, the DRAG sub-routine 41 is illustrated in more detail. In the DRAG sub-routine 41, the data icon may be moved at decision block 98, copied at decision block 100 or some other action performed at block 104. The other actions at block 104, may comprise, for example, creating a link between two events, as is known in the art, and then the sub-routine 41 returns to block 32. If copy at decision block 100 is to be performed, the data icon is duplicated at block 102. After move at block 98 or after duplication at block 102, the icon position is monitored at block 106. The icon is dropped at decision block 108 or returned to decision block 98. If the icon is dropped, the icon position is read for data values at block 110. Any differences in data values are determined at block 112 and if a change in size is required at decision block 114, the data icon's visual frame is adjusted at block 116. If no change in size at decision block 114 is required or after block 116, the data icon's data is updated at block 110. The display buffer is updated at block 120 followed by updating the display at block 122. The sub-routine 41 then returns to block 32.

If it is desired to update either the enlarged or the minimized data icon, the UPDATE sub-routine, as identified by the reference numeral 43, is called. The UPDATE sub-routine 43 is illustrated in more detail in FIG. 9. In the UPDATE sub-routine 43, the user input is monitored at block 130. Any differences between the information already stored and the new information is determined at block 132. At decision block 134, it is determined whether any difference in the information requires a change in data icon size. If a change in size is required, the minimized data icon visual frame is adjusted at block 136 followed by the change in position at block 138. If no change in size is required at block 134, block 136 is bypassed to the change position decision block 138. If a change in position at block 138 is required, the minimized data icon's position is adjusted in object at block 140 followed by an update of the display buffer at block 142. If no position change at block 138 is required, block 140 is bypassed to the update display buffer at block 142. The updated information is then displayed at block 144. The sub-routine 43 then returns to block 32.

Figure 10:
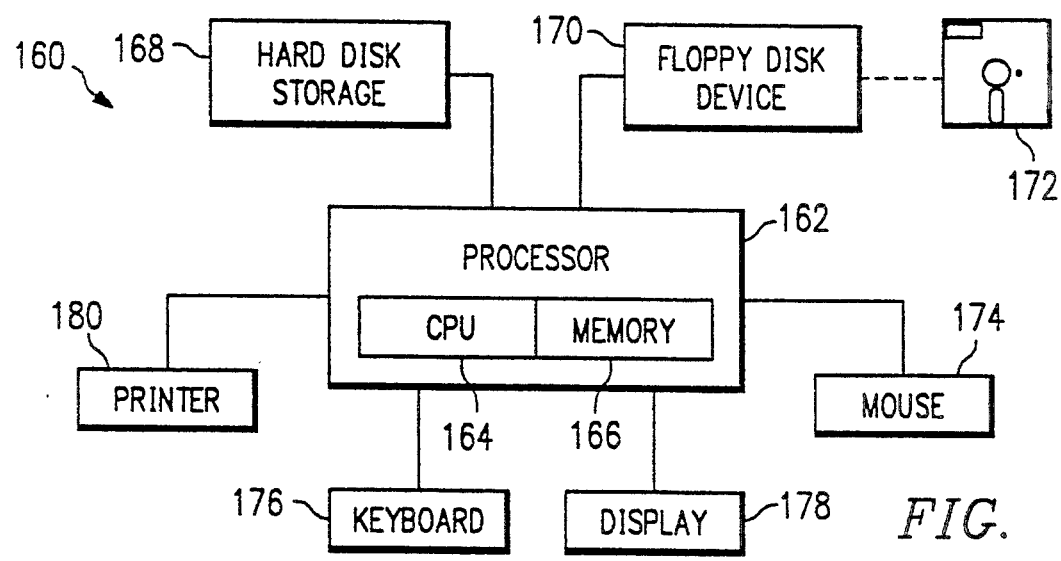
FIG. 10 is a diagram of a data processing system in accordance with the present invention.

Referring now to FIG. 10, there is shown, in block diagram form, a data processing system, generally identified by the reference numeral 160, in accordance with the present invention. The system 160 includes a processor 162, which includes a central processing unit (CPU) 164 and a memory 166. Additional memory, in the form of a hard disk storage 168 and a floppy disk device 170, is connected to the processor 162. The floppy disk device 170 receives a floppy disk 172 which has computer program code recorded therein that implements the present invention in the system 160. The system 160 further includes user interface hardware such as, for example, a mouse 174 and a keyboard 176 for allowing user input to the processor 162, and a display 178 for presenting visual data to the user. The system 160 may also include a printer 180.

Although the present invention has been particularly shown and described with reference to a preferred embodiment, it will be understood by those skilled in the art that various changes in form and detail may be made without departing from the spirit and the scope of the invention.

What is claimed is:

1. A method of interactively entering data into an application in a data processing system which includes a monitor and at least one input device, comprising the steps of:

selecting with the input device a data icon appearing on the monitor, said data icon having a first minimized size and upon selection thereof an enlarged size, wherein said first size data icon may be selectively directly manipulated;

entering data with the input device into said enlarged size data icon, wherein a textual summary of said data is presented for observation in said minimized size; and directly editing said data in said first minimized size data icon.

2. The method of claim 1, further comprising the step of:

reducing said enlarged size data icon to said minimized size data icon.

3. The method of claim 2, further comprising the step of:

editing said data in said enlarged size data icon.

4. The method of claim 1, further comprising the step of:

dragging said first size icon to a different position in the application in order to change the data in said first size icon.

5. The method of claim 1, further comprising the step of:

changing a location of said first size data icon by changing data in said first size data icon.

6. The method of claim 1, further comprising the step of:

changing said first minimized size of data icon by entering additional data into said data icon.

7. A computer system for interactively inputting data into an application running thereon, comprising:

a data icon having a first minimized size and upon selection of said first minimized size, a second enlarged size, wherein said first size data icon may be selectively directly manipulated;

means for entering with an input device, data into said enlarged data icon, wherein a textual summary of the data is presented for observation in said minimized data icon; and means for directly editing said data in said first minimized size data icon.

8. The computer system of claim 7, further comprising:

means for reducing said enlarged size data icon to said minimized size data icon.

9. The computer system of claim 8, further comprising:

means for editing said data in said enlarged size data icon.

10. The computer system of claim 7, further comprising:

means for dragging said first data icon to a different location in the application in order to change the data in said first size data icon.

11. The computer system of claim 7, further comprising:

means for changing a location of said first size data icon by altering the data in said first size data icon.

12. The computer system of claim 7, further comprising:

means for changing said first data icon size by entering additional data into said data icon.

* * * * *